United States Patent
Schmidt et al.

(10) Patent No.: US 8,989,907 B2
(45) Date of Patent: Mar. 24, 2015

(54) PROCESS AND APPARATUS FOR ADEQUATELY IRRIGATING SOIL

(75) Inventors: Walter Schmidt, Russikon (CH); Yucel Toprak, Zurich (CH)

(73) Assignee: Plantcare AG, Russikon (CH)

( * ) Notice: Subject to any disclaimer, the term of this patent is extended or adjusted under 35 U.S.C. 154(b) by 587 days.

(21) Appl. No.: 13/375,009

(22) PCT Filed: May 25, 2010

(86) PCT No.: PCT/CH2010/000135
§ 371 (c)(1),
(2), (4) Date: Feb. 1, 2012

(87) PCT Pub. No.: WO2010/139079
PCT Pub. Date: Dec. 9, 2010

(65) Prior Publication Data
US 2012/0130552 A1 May 24, 2012

(30) Foreign Application Priority Data

Jun. 3, 2009 (CH) .......................... 842/09

(51) Int. Cl.
| | |
|---|---|
| *G05D 11/00* | (2006.01) |
| *G05D 7/00* | (2006.01) |
| *A01G 25/09* | (2006.01) |
| *A01G 25/16* | (2006.01) |
| *A01G 29/00* | (2006.01) |
| *G01C 21/00* | (2006.01) |
| *G01C 21/34* | (2006.01) |
| *G08G 1/123* | (2006.01) |
| *G01K 11/30* | (2006.01) |

(52) U.S. Cl.
CPC .............. *A01G 25/09* (2013.01); *A01G 25/167* (2013.01); *A01G 29/00* (2013.01)
USPC ............... 700/284; 700/283; 701/1; 701/415; 701/420; 702/115; 702/134

(58) Field of Classification Search
CPC ....... A01G 25/09; A01G 29/00; A01G 25/167
USPC .......... 700/281–284; 701/1–2, 408, 415, 420; 702/115, 134
See application file for complete search history.

(56) References Cited

U.S. PATENT DOCUMENTS

| 5,927,603 | A | 7/1999 | McNabb | |
|---|---|---|---|---|
| 6,095,439 | A * | 8/2000 | Segal et al. | 239/729 |
| 6,290,151 | B1 * | 9/2001 | Barker et al. | 239/729 |
| 6,618,673 | B2 * | 9/2003 | Zur | 702/2 |
| 6,928,339 | B2 * | 8/2005 | Barker | 700/284 |

(Continued)

FOREIGN PATENT DOCUMENTS

| JP | 2004012452 | 1/2004 |
|---|---|---|
| WO | 00/15987 | 3/2000 |
| WO | WO 2004005628 A2 * | 1/2004 |

*Primary Examiner* — Ramesh Patel
(74) *Attorney, Agent, or Firm* — Rankin, Hill & Clark LLP (57) ABSTRACT

A mobile apparatus and a process for adequately irrigating soil, wherein the apparatus has an irrigation unit for irrigating soil and a mobile microwave measurement unit for determining the water content of the soil along a measurement path. A control unit is used to irrigate the soil along the measurement path depending on the measured water content. The apparatus preferably also has a water tank and leaves an area of soil to be irrigated autonomously.

28 Claims, 5 Drawing Sheets

(56) References Cited

U.S. PATENT DOCUMENTS

| | | | |
|---|---|---|---|
| 8,325,030 B2* | 12/2012 | Townsend et al. | 340/539.11 |
| 2003/0024155 A1* | 2/2003 | Kuroda et al. | 47/1.01 R |
| 2005/0199842 A1* | 9/2005 | Parsons et al. | 251/129.04 |
| 2008/0046130 A1* | 2/2008 | Faivre et al. | 700/284 |
| 2008/0074254 A1* | 3/2008 | Townsend et al. | 340/539.11 |
| 2011/0303310 A1* | 12/2011 | Klicpera | 137/551 |
| 2011/0303311 A1* | 12/2011 | Klicpera | 137/551 |

\* cited by examiner

PROCESS AND APPARATUS FOR ADEQUATELY IRRIGATING SOIL

BACKGROUND OF THE INVENTION

1. Field of the Invention

The invention relates to an apparatus and a method for irrigating areas of ground according to requirements as provided by preamble of the independent patent claims.

2. Description of Related Art

The irrigation of areas of ground according to requirements, in particular areas of grass or areas under cultivation, is increasingly gaining in significance, since water demand is a very important economic factor—especially in critical climatic zones. Therefore, a series of methods have been developed to adapt the water input to the requirement of the plants. Apart from the evaluation of weather data and resultant predictions of the irrigating period, soil moisture sensors are also known, sensors which electronically measure the moisture in the soil and determine the irrigating time and/or the irrigating period by the aid of a control circuit, as described for example in WO 2007/059 636.

With such stationary sensors, measuring is performed at discrete points. Correspondingly, the results achieved with these methods are all the better the more uniform the soils to be irrigated are and the more uniform exposure to the sun is. This is the case, for example, with unroofed sports facilities. In other applications, such as soils left to nature in gardens, parks or agriculturally exploited soils, this condition is not satisfied. The composition of the soils, and consequently also the water storage capacity (field capacity), may vary very greatly. The form of terrain also plays an important part, since the water can flow off more quickly on slopes than in shallow depressions. Moreover, there are areas which may, for example, be shaded by buildings or trees, while other areas are fully exposed to the sun. In such cases, the areas must be divided up and assigned their own soil moisture sensors, so that the irrigation can be controlled in accordance with the needs of these zones. In this way it is already possible to achieve a reduction in water consumption of up to 30%.

A further influencing factor in minimizing the amount of water is the uniformity of the water distribution that can be achieved by an irrigating apparatus, such as for example a sprinkler. This is typically in the range of +/−50%, i.e. irrigation must always be continued much longer to the areas that are undersupplied. In this way, however, the other areas passed over are oversupplied, i.e. water is wasted. The larger the area intended to be covered by the sprinkler, the poorer the uniformity of the water input will turn out to be. In addition to this there is the influence of wind, which can blow the water about considerably, and the influence of solar irradiation and heat, under which some of the water evaporates before it reaches the ground.

For example, golf courses have a very high water consumption, and correspondingly high water costs. They reportedly have annual water consumption amounts of between 100,000 and 300,000 $m^3$ of water. Moreover, investment costs and maintenance costs for the irrigation infrastructure are very high. The structure of the soil is generally very homogeneous—since it has been artificially laid. Even so, golf courses also have shaded areas or slopes where the water can flow off quickly.

For the reasons mentioned, it would be desirable to use an irrigation technique which could determine the current water requirement at every desired point of the area to be irrigated. Moreover, there is the requirement for a water distributing technique which on the one hand ensures a uniform distribution and at the same time prevents unnecessary delivery or evaporation of water. Furthermore, not only with respect to the investment but also in operation and maintenance, such a technology should be as low-cost as possible.

BRIEF SUMMARY OF THE INVENTION

The object of the invention is to provide an apparatus and a method with which the aforementioned aims can be achieved.

This object is achieved by the apparatus and the method described in the independent patent claims.

The invention achieves the set object, in particular in applications in the area of irrigating areas of grass and irrigating homogeneously planted areas in a very simple way, but is not restricted to the application in such cases.

Superficial scanning of the ground does not allow anything to be ascertained about the moisture of the soil itself. To achieve this, other methods must be used, though so far only stationary measuring stations that are at least partially inserted in the ground have been used in the area of irrigating areas of ground.

For example, the document U.S. Pat. No. 5,927,603 describes a method which uses a passively operating video-camera on a mobile irrigating device to obtain a two-dimensional image of the ground with the aid of infrared or ultraviolet radiation.

This optical method is used to detect the infestation of plants by pests or else to establish abnormal leaf states or fallen leaves. As before, measuring the moisture of the soil is accomplished by stationary soil moisture sensors inserted in the ground.

The document WO 00/15987 describes an irrigation system which likewise comprises a series of sensors. Sensors based on reflected or emitted electromagnetic radiation are used, infrared thermometers, including infrared thermocouples (IRTs) being mentioned as types of sensor. These sensors are arranged at a relatively great distance from the surface of the ground, in order that a sufficiently large area can be scanned. However, WO 00/15987 does not disclose soil moisture sensors or any information about irrigation by the aid of measuring the soil moisture.

In order to carry out a local measurement of the soil moisture at any desired location, the apparatus and the method according to the invention measure the soil moisture by using a mobile sensor that has no or only slight contact with the ground, and can therefore be used movably and no longer just stationarily.

By the aid of specially designed microwave transmitters which emit in the range from 868 MHz to about 2.6 GHz, preferably at 2.4 GHz, it is possible to measure the soil moisture to a depth of about 1 meter—depending on the energy emitted. In this case, the water molecules are excited to rotate by the alternating field, i.e. they absorb energy, which is used in a microwave oven for the rapid heating up of foods containing water. With low energy of a few milliwatts to a few watts and measuring times in the range of a few milliseconds, the heating effect is insignificant. A minimal heating effect in soil would also be negligible.

The overall electrical losses of a material are made up of the sum of the dielectric losses and the losses through DC conductivity of ions in the soil. At frequencies of over 2 GHz, the ion conductivity decreases greatly, so that in practice only dielectric losses are measured and, for example, the salt content of the soil is no longer significant.

The depth of penetration of the microwave in the ground on the one hand greatly depends on the water content of the soil, but on the other hand also depends on the emission energy and a chosen antenna design. If the emitted microwave energy and at the same time the energy reflected by the ground are measured, a measure of the moisture can be derived from the ratio of the two. Moist soil absorbs a large part of the energy and only a little is reflected.

A reflected wave also has a phase shift in comparison with an incident wave, which makes it possible to ascertain the vertical moisture structure of the soil.

For measuring, a microwave sensor is preferably placed perpendicularly over soil. The sensor both emits and measures. However, it is also possible to provide a possibly additional microwave detector at a distance from a microwave transmitter, and possibly at an angle thereto. In this way, moisture depth profiles of the soil can be created.

If a soil is constant in its nature over the area to be measured, i.e. the mineral structure and stratification thereof are constant, it is possible to work effectively with a constant emission energy. The measurement then shows a mean value of the soil moisture to a depth of penetration determined by the energy chosen. The layers lying in the upper region are in this case preferably weighted more strongly.

As an example: if it has rained for a short time and the soil has been saturated only to a depth of a few cm, the measuring instrument shows a high moisture content, since almost all the energy is already absorbed in the upper region of the ground. However, by choosing the emission energy, a depth of penetration of the microwaves can be continuously varied, which allows new findings to be ascertained about the nature of the soil.

It is also possible to work with a number of sensors, for example two sensors, of different antenna designs. For example, one sensor measures in an upper region of the ground, for example 0 to 5 cm, another sensor in a lower region of the ground, for example 10 to 20 cm. This allows the vertical moisture distribution likewise to be quantitatively determined. The use of a number of sensors with finely graduated antenna designs allows a measurement to be resolved even more finely, if desired.

The particular advantage of the method referred to is that a measuring time is very short. Moreover, the material to be measured is scarcely touched, or is not touched, and the measurement can therefore be performed continuously and automatically. Furthermore, the method is very sensitive. Even the slightest changes in the water content can be measured. The flexibility of the method also allows a spontaneous change of measuring mode, for example change of the incident energy.

It is thus possible to produce an irrigation system for irrigating soil according to requirements in which a mobile irrigation unit and a mobile microwave measuring unit for determining the water content of the soil along a measuring path are combined. In this case, the soil is irrigated using the irrigation unit in accordance with a measured water content along the measuring path. This is preferably regulated by the aid of a control unit, which at the same time may be combined with a control unit for a movement of the system.

The main advantages of the method and the apparatus are that the system is based on the plants' current water requirement. As a result, they offer the possibility of optimally supplying areas with differing water requirements. At the same time, a maximum saving of water can be achieved. Moreover, with this system conventional irrigating methods can be optimized and simplified. For example, it is possible to eliminate weather stations or soil moisture sensors, good and constant contact with the ground being essential for the latter. It is also possible in preferred embodiments to dispense with the laying of irrigating pipes or the fitting of solenoid valves.

For example, golf courses have to be provided with a drainage system covering a large area in order as far as possible to collect excess water, clean it and return it to the irrigation. By the method according to the invention, consequently, not only investment costs but also maintenance costs are massively reduced. Working of an area of ground is often also hindered by pipes, hoses or sensors inserted in the ground, and this is made correspondingly easier by the apparatus and method according to the invention.

If, moreover, only a relatively small area of ground is covered by an irrigation unit, the uniformity of the water input is very high and no water is wasted through excessive irrigation. A measuring and irrigating path may also cross over arbitrarily, since crossing of a track that has already been irrigated is detected by a moisture measuring unit and it is correspondingly not irrigated again.

In a preferred embodiment of the invention, the mobile irrigating apparatus substantially comprises a traveling water tank, on the front underside of which a corresponding microwave moisture measuring instrument is provided. The measuring of the water content of the grass can be performed continuously, or almost continuously, during the journey. If the tank car travels over a region with a water requirement, the irrigation unit integrated in the car is automatically activated and water is delivered. In regions without a water requirement, no water is discharged. The amount of water per unit of time—for example variable by changing water pressure—or the period for which irrigation takes place at the same location can be made dependent on the degree of water shortage.

The mobile irrigation system or the tank car may be manually controlled, or, for example by analogy with the known automatic lawnmowers that are controlled by using induction loops, may autonomously travel over an area of grass, travel over it by using stored area data or else be guided along a predetermined path by guiding cables or bars.

If a water tank is empty, a predetermined minimum or possibly also a time limit is reached, a tank car travels to a refueling station (docking station), preferably automatically. There, if required, a power supply, for example batteries, is charged and, if a tank is present, it is filled, preferably automatically.

In the case of large areas, such as golf courses, etc., is also possible for a number of cars or irrigation systems to be used at the same time. These may, for example, be programmed by an integrated GPS system such that they automatically avoid prohibited areas, such as trees, bunkers, etc. Distance sensors, which detect obstacles so that a car can evade or avoid them, may also be used. Consequently, an irrigating apparatus may travel over an area both in a directed manner and in a 'directionless' manner, it being possible for the area that is to be irrigated to be demarcated by the aid of induction loops.

An electronic device for determining a measuring path is preferably designed such that it allows a mobile measuring device to be automatically located.

If a mobile irrigating apparatus is not equipped with a tank, a combination with a mobile irrigation system is possible for example, as known from EP 1 849 354. There, a number of hydrants are fitted along a predetermined path, typically at regular intervals. The car is substantially a mobile irrigation system which travels over the predetermined path. The car is thereby guided mechanically or electronically and respectively docks onto the hydrants that are present. The advantage of such a combination is that an area is not supplied arbitrarily by the known overwatering and/or underwatering but is irrigated according to requirements, in accordance with the moisture data measured.

It is also possible to use the method according to the invention where plants are arranged in rows, such as vines, rows of trees in nurseries, etc. Since, in particular, the microwave sensor referred to is able to measure the moisture to a depth of 1 m, it is possible to imagine an irrigation system that advances step by step from plant to plant, for example vines, measures the moisture and applies water in accordance with the requirements of the plants.

If required, an exact positioning of the system from the plant can be achieved, for example by passively operating RFID chips or else optical reflectors which are fastened to the plants or plant holders.

One disadvantage of known sprinkler systems is that water is sprayed onto a grassy surface. When this happens, a large part of the water remains on the grass and only part seeps into the ground. As a result, a large part of the water intended for the roots evaporates uselessly. In order to avoid this disadvantage, a novel method of supplying water has been developed for a further embodiment of the invention. In this method, water is introduced directly into the soil. This preferably takes place by the aid of high pressure and/or injectors penetrating into the soil.

Thanks to this method, the evaporation of water remaining on the surface is reduced to virtually zero. Moreover, the amount of water necessary for reliably supplying the roots is likewise reduced. The water that normally seeps in from above is absorbed in large part in the uppermost layers of the ground. However, this layer is also heated up the quickest and the most by solar irradiation, so that this water rapidly evaporates again. With the present method, it is possible to bring water into deep regions, directly to the regions of the roots.

The document JP8116708 describes a method in which water is injected into an area of grass by applying high pressure. The advantage of this method lies in the fact that the water is not sprayed onto the surface of the area of grass but injected into the soil. As a result of the much lower evaporation, this allows water to be saved.

However, the method described has major disadvantages. On the one hand, a high water pressure of about 50-100 bar has to be generated, which not only requires energy but also necessitates complex, i.e. expensive, pumps and installations. Furthermore, the area of grass is highly stressed, since the high-pressure water jet causes damage in the region of the roots. This method has therefore not become established in practice.

In order to exploit the advantages of high-pressure injection, but avoid its disadvantages, a method which works with much lower water pressure, typically between 2 and 40 bar, preferably between 2 and 30 or 5 and 20 bar, for example 5 and 15 bar, and accordingly also has much lower equipment costs, has now been developed.

If the pressure is optimally set, the water can be applied at a certain, desired depth. In this case, the water can be "fired" continuously, or else in pulses. Moreover, it is advantageous to use an arrangement of nozzles that are able to cover a larger area. Oscillation of an array of nozzles is also possible.

Depending on the nature of the soil and the operation of the water injector or the mobile irrigation system, the water jet produces small slits or holes. These at the same time bring about better aeration of the area of grass. It may consequently also be possible to dispense with separate verticulation of an area of grass or other planted area to aerate the same.

In a preferred embodiment, water is applied by the aid of injectors. An injector in this case penetrates to a greater or lesser extent into the soil, so that water is introduced directly into the soil. This on the one hand allows water to be introduced directly to different depths and on the other hand consequently allows the water pressure to be reduced.

If the irradiation system is used on areas where there is not 100% coverage of the soil, it is possible by a simple color detection device, for example a color sensor, to establish automatically whether the system is on a grassy area or a bare area. This information can be used for controlling the irrigation.

It is also possible to combine the irrigation system, in particular the tank car, with a lawnmower.

In a further embodiment of the invention, the preferably automatically traveling car comprises one or more moisture measuring sensors, but preferably not an irrigating device. The car travels over an area to be irrigated either on predetermined tracks or in a "directionless" manner, and thereby measures the soil moisture continuously or at intervals, preferably regular intervals. This is then assigned to position coordinates and recorded in a moisture map. On the basis of this moisture map, it can then be decided in which regions irrigation will proceed by the aid of a mobile or fixedly installed irrigation system, and in which regions irrigation can wait a little longer.

BRIEF DESCRIPTION OF THE DRAWINGS

Preferred embodiments of the method and apparatus are described in the following figures, in which.

DETAILED DESCRIPTION OF THE INVENTION

Figure 1A:
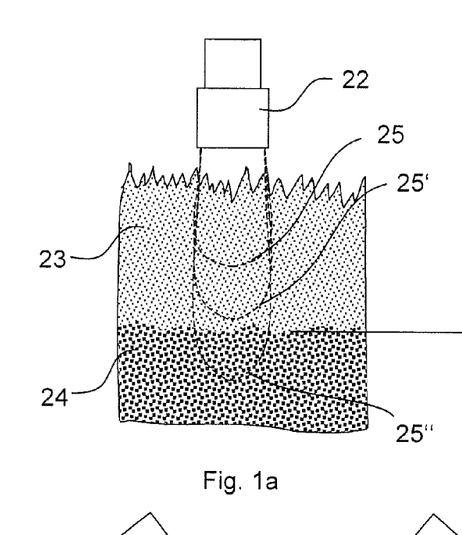
FIG. 1a shows a microwave transmitter for measuring soil moisture.

Schematically represented in FIG. 1a is a microwave transmitter 22, which is arranged contactlessly over soil with a dry layer 23 and a more moist layer 24 lying thereunder. Three curves 25, 25' and 25" denote ranges of penetration of the microwave radiation that are formed with three different radiation energies. With lower energy, the radiation of course penetrates less deeply than with higher emission energy of the source.

Figure 1B:
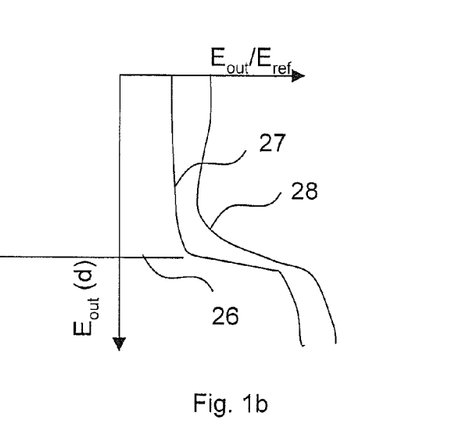
FIG. 1b shows curves for soils of different natures.

Since microwave radiation is absorbed to a greater extent in the more moist layers, less radiation is also correspondingly reflected. Schematically represented in FIG. 1b are two curves 27, 28, which show the ratio of emitted energy to reflected energy (Eout/Eref) in comparison with the emitted energy (Eout) in dependence on the depth d. The limit between the dry region 23 and the moist region 24 is depicted by a line 26. If the wave lobe of the microwave radiation penetrates into the moist region, considerable energy is absorbed and less energy is reflected. Preferably after a calibration of the system is performed by carrying out a measurement on a completely dry layer of soil, the reflected energy can be assigned to an average measuring depth.

In practice, layers of soil are not sharply separated and curves are correspondingly less stepped. Nevertheless, for example by fixing limit values, such as for example the Eout/

Eref ratio limit value, regions with a higher water requirement can be clearly distinguished from those with a lower water requirement.

If the soil is grown over, for example with grass, the water-containing root mass that is present in the soil has the following effect on the measuring curve: the roots and the soil surrounding them appear on average as more moist than without roots, i.e. the curve follows a path such as that schematically shown in curve 28 in FIG. 1b. Since the roots absorb water from the soil and feed it to the plant, at a certain depth of the soil there is a minimum of moisture. This minimum can also be sensed by measuring instruments and used for controlling the irrigation.

If the soil is relatively dry, the roots also contain less water and the change in the curve is less pronounced.

Figure 2A:
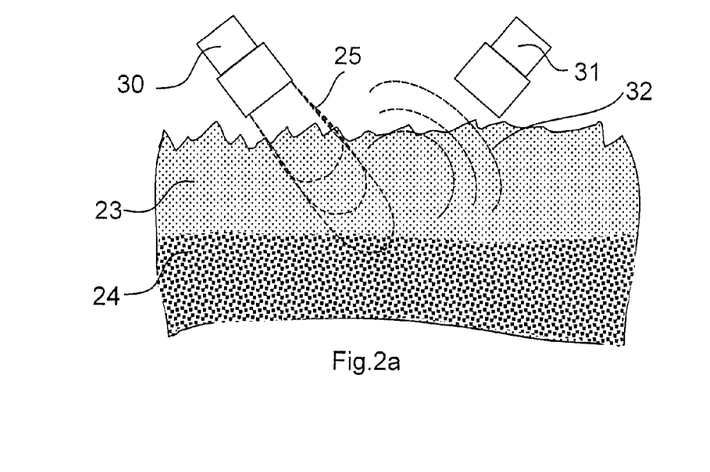
FIG. 2a shows an arrangement comprising a microwave source and a detector.

Shown in FIG. 2a is an arrangement of a microwave source 30 and a microwave detector 31, which together form the sensor. The source and the detector are in this case arranged at an angle of about 25-50° to the perpendicular. The energy emitted by the source, which is depicted by the aid of dashed curves 25, is partially reflected (depicted by curves 32) and measured by the microwave detector. With such an arrangement, very precise depth profiles can be obtained, since reflected waves from different depths can be detected.

Such microwave measurements can be carried out in a very short time. They can be performed continuously, since soil to be measured does not have to be touched.

In order to obtain quantitative measured values, a calibration for a certain type of soil is preferably performed. In this case, a region of the ground about one square meter in size, for example, is excluded from any irrigation, i.e. is kept dry. If measuring is performed at this location, the baseline for the dry soil is determined. Any value deviating from this is attributable to the influence of the soil moisture.

Figure 2B:
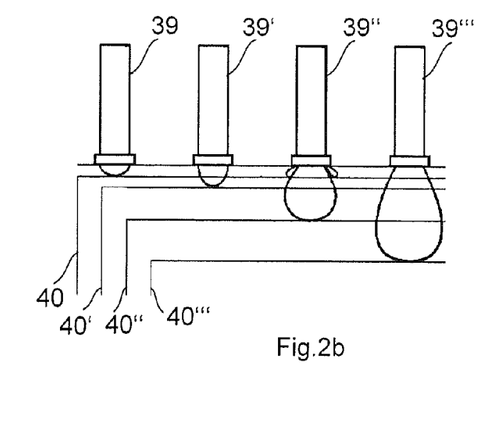
FIG. 2b shows sensors with different measuring depths.

Schematically shown in FIG. 2b are a number of microwave sensors 39, 39', 39'', 39''' with differently pronounced wave lobes. The sensors are able to measure in different depth ranges of the soil 40, 40', 40'', 40''' in accordance with different emission outputs.

Figure 3:
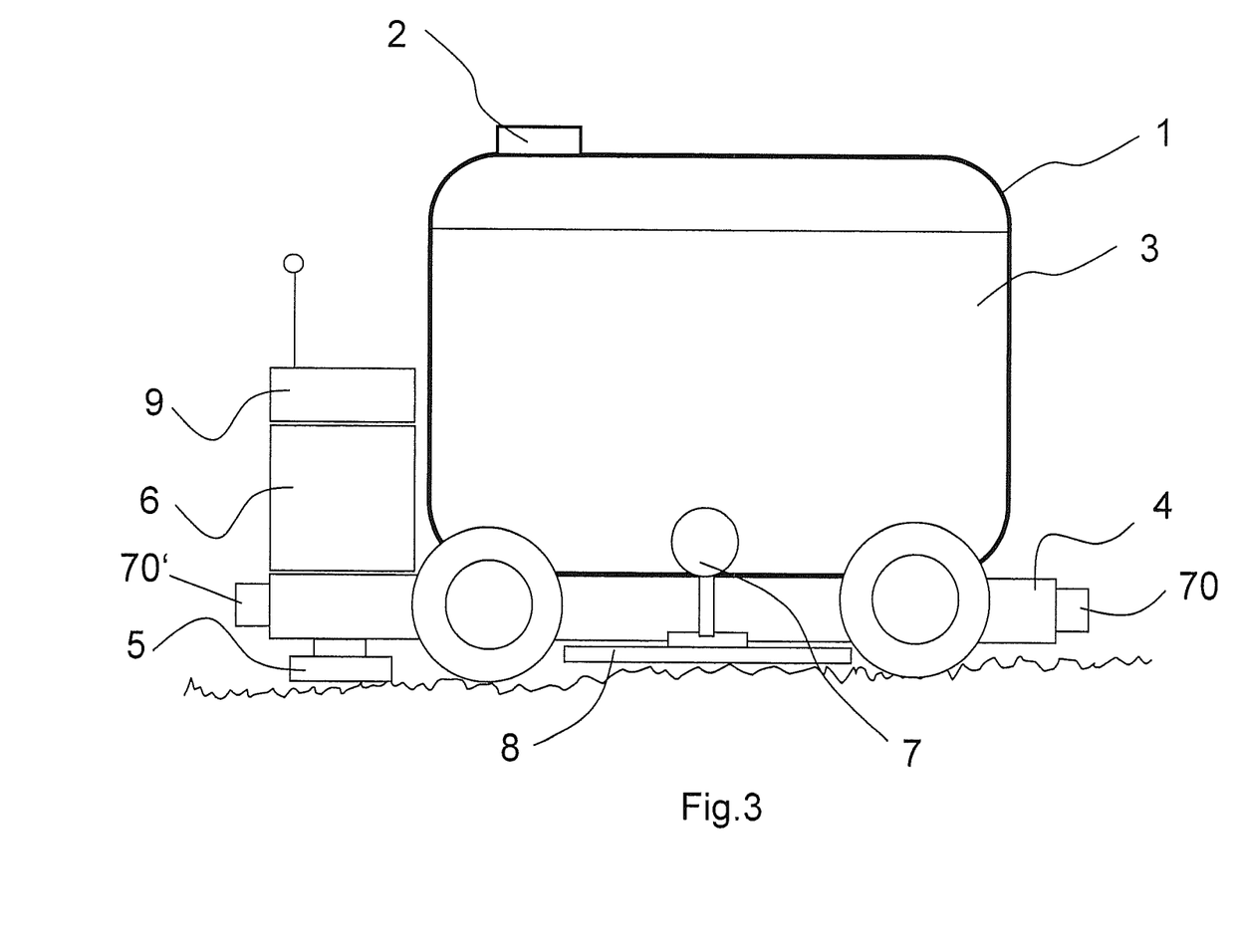
FIG. 3 shows a mobile irrigating car with a moisture sensor and a tank.

In FIG. 3, a tank 1 filled with water 3 and having a filling nozzle 2 is fastened on a mobile car 4. One or more microwave sensors 5 for contactlessly measuring the moisture of the soil are provided on the front of the vehicle at a small distance from the surface of the ground. Typical distance ranges are 0 to 10 cm, preferably 0.5 to 5 cm, for example 1.5 to 3 cm. An electronic control device 6 controls the sensor and an irrigation system 8. If the moisture goes below the moisture limit value, which can preferably be set in advance, a pump 7 is activated by the control device, preferably for a predetermined time period, and consequently water is distributed over the area of ground using the irrigation system 8. In this figure, the irrigation system is mounted underneath the car, near the ground. Consequently, very directed, and local, irradiation is possible. In order to make irrigation cover a larger area, it is also possible to mount a sprinkler device in an upper part of the car or on the tank.

The car has at the front and the rear a respective obstacle sensor 70, 70', with which it is intended to avoid collisions with obstacles. These obstacle sensors may be distance sensors of a known type and also be provided at the corners or sides of the car.

Depending on requirements, a moisture measurement may be carried out continuously or discontinuously.

Optionally, a navigation system 9 automatically steers the car within a predetermined region, so that the region is preferably traveled over completely. For example, machines which move arbitrarily within a fixed region and change their direction substantially only when they encounter obstacles or limits are known from the area of mobile lawnmowers.

The speed of the car may be controlled, preferably depending on the water content of the area of ground. If the soil does not require any water, it travels more quickly, if a shortage of water is detected it travels more slowly, in order to have sufficient time for irrigation.

If a GPS system is used, the local water requirement for a given region of an area can be continuously measured and the measured values entered in a map. This allows the determination of critical areas, which for example require particularly intensive irrigation. It is also possible for the plant coverage of an area and a corresponding water requirement also to be already stored in advance in a corresponding electronic system.

The size of the water tank 1 can be adapted to the intended use of the irrigating apparatus. The fact that irrigation is performed according to requirements, and consequently very sparingly, means that it is possible to dispense with the large amounts of water that are otherwise customary. An indicator, for example a filling level sensor, may be additionally provided in the tank, in order to indicate or possibly control a requirement for the tank to be refilled.

If the apparatus is also combined with high-pressure irrigation and/or irrigation by using injectors, water can be additionally saved, since it is brought in an even more directed manner precisely to where it is required, and does not unnecessarily evaporate.

Figure 4:
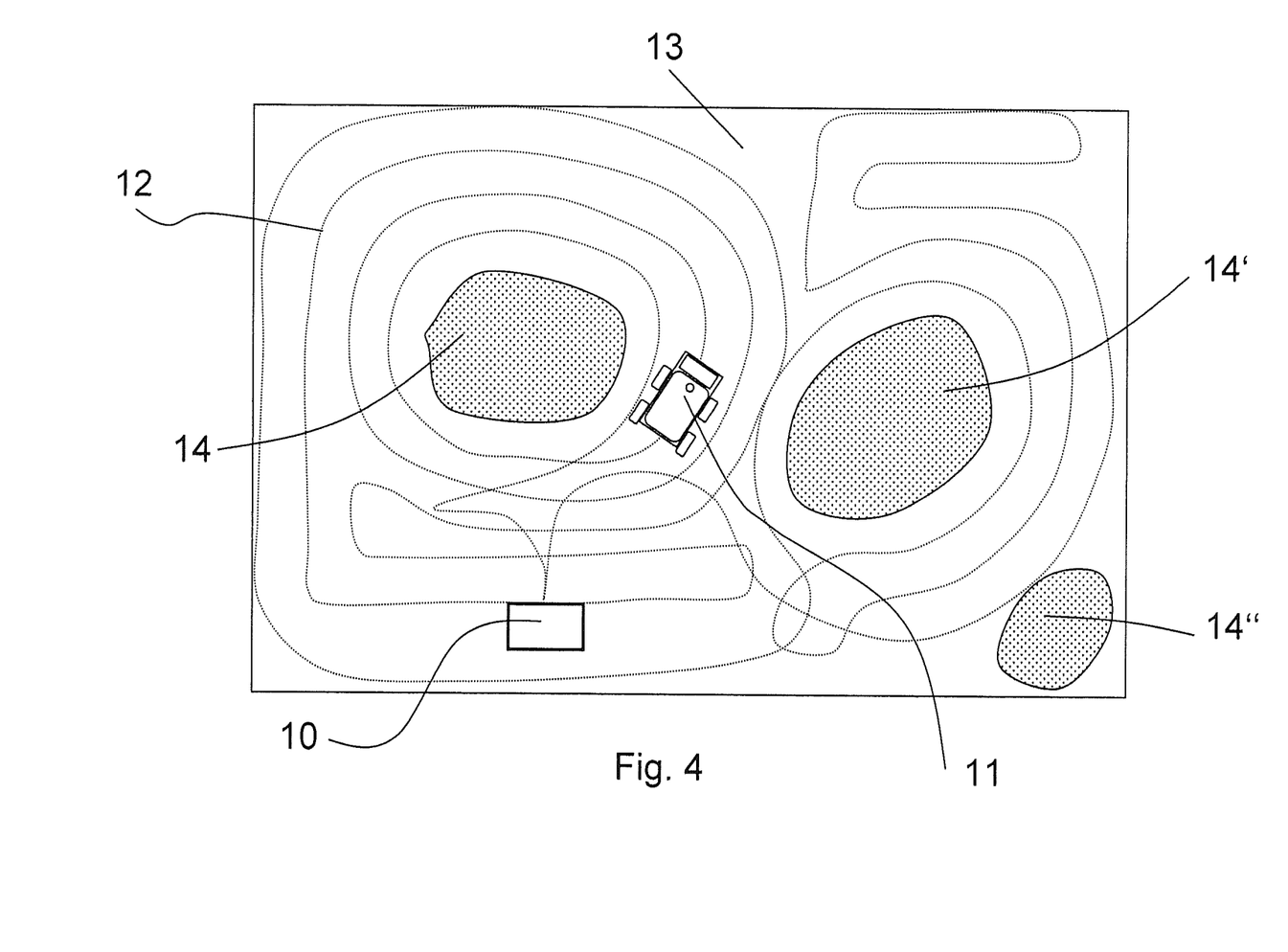
FIG. 4 shows an application method with an irrigating car.

FIG. 4 shows, by way of example, a rectangular area 13 to be irrigated, with three prohibited zones 14, 14', 14'' and a docking station 10. An irrigating car 11, for example according to FIG. 3, travels over the area 13 along a predetermined or self-defined path 12 in such a way that, as far as possible, all regions are covered.

As known from mobile lawnmowers, the area may be traveled over randomly (self-determined path). A maximum area to be traveled over is then delimited for example by a laid wire or, for example, is stored as a map. Such data may be present in the electronic system in the car itself, but also, for example, in a recharging station. The communication between the docking station 10 and the irrigating car also takes place in a known way, for example by the aid of radio, infrared, GPS, etc.

It is also possible to have a number of docking stations, in particular in the case of expansive areas to be irrigated. In this case, preferably the closest is traveled to for recharging.

Docking stations may also be designed as hydrants, as described for example for the mobile irrigation system according to EP1849354. Correspondingly, an irrigating car may also be designed without a tank and be guided along predetermined tracks (predetermined path).

In order to avoid unnecessary starting of the irrigating car, stationary sensors may be used at exposed positions, sensors which only give the go-ahead for an irrigating operation if the soil moisture has fallen below a critical value.

Figure 5A:
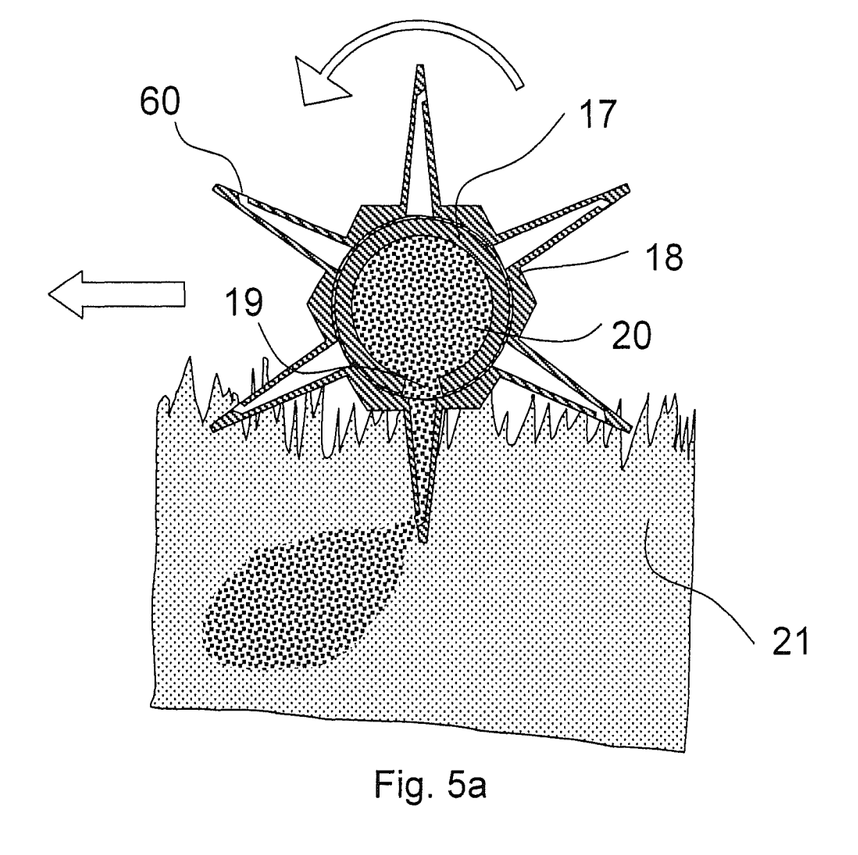
FIGS. 5a-c show methods for the high-pressure injection of water.

In FIG. 5a, the principle for introducing water by the aid of injectors is schematically represented in a lateral sectional view. In this case, a wheel 18 fitted with a number of injectors 60, 60' or injection nozzles rotate on a hollow spindle 17. This spindle has one or more slits 19 in the lower region. Water 20 is fed in via the hollow spindle and will always be discharged into the soil 21 whenever an injector 60, 60' 60'' is located in the region of the slit 19. The injectors that are not located in the region of slits are preferably sealed with respect to the hollow spindle, and cannot eject any water.

The injectors have a preferred length of 2 to 15 cm, for example 10 cm, and typically penetrate 1 to 10 cm, preferably between 2 and 8 cm, for example 3-5 cm, into the soil. This allows the water pressure to be much lower than when the upper region of the ground interspersed with roots has to be penetrated by the water jet. An optimum distribution of the water in the soil can also be achieved by an optimized arrangement of the injectors.

The outlet openings of the injectors are preferably arranged in an outermost region of the injectors, but on the side facing away from the direction of movement of the injectors. In this way, earth can be prevented from also getting into the injection openings when the injectors penetrate into the soil. Moreover, the water forced into the injectors under high pressure is used at the same time for cleaning them.

As shown in FIG. 5a, six injectors are arranged regularly at an angle of 60° over the circumference of the wheel. It is also possible to arrange more or fewer injectors, for example a single injector or a single row of injectors.

Figure 5B:
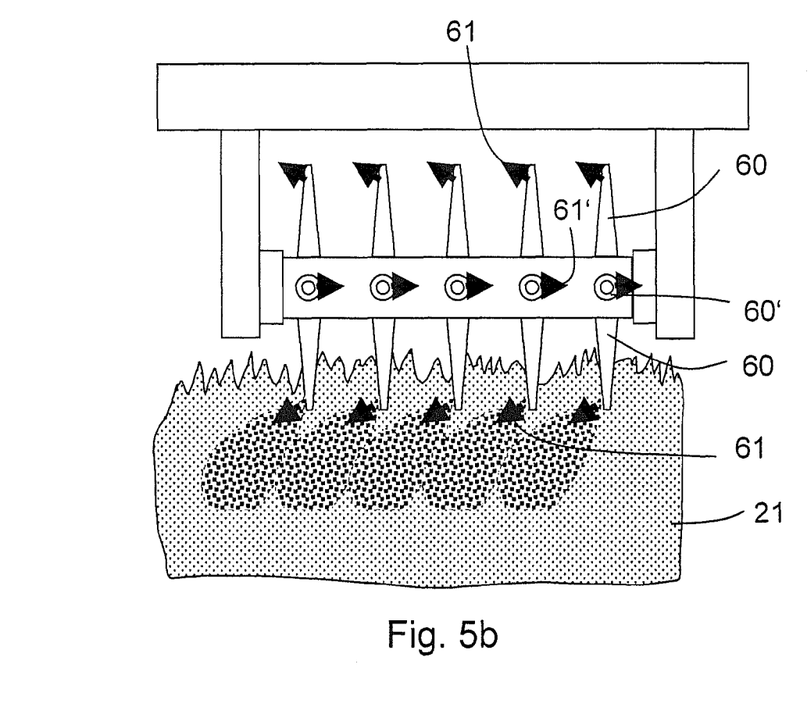

A front view of an arrangement of nozzles is represented in FIG. 5b. In this case, only four injectors, arranged at 90° in relation to one another, are depicted for the sake of clarity, 5 such individual arrangements being respectively arranged next to one another. If the outlet openings on the injectors 60, 60' are arranged alternating substantially in opposing directions—as indicated by arrows 61, 61'—a very homogeneous distribution of water in the soil can be achieved.

Figure 5C:
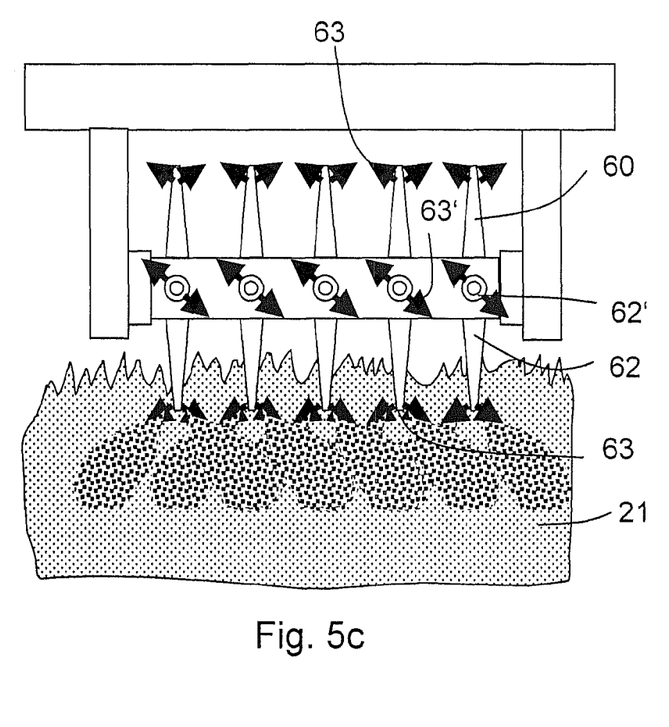

A further embodiment is represented in FIG. 5c. In this case, each injector 62, 62' is provided with two outlet openings, which are turned by about 45° with respect to the axis, in order to achieve a still more homogeneous water distribution. An outlet direction of water from the injectors 62, 62' is once again depicted by arrows 63, 63'.

The penetration of the slender injectors into the soil takes place during the forward movement of the wheel, which is preferably provided on a water-carrying car. The rotation of the injector roller consequently does not require an additional drive. The soil and the vegetation are not damaged, while injectors create small holes which improve the aeration of the soil and also the penetration of rainwater.

In the case of very sensitive grassed areas, such as for example the greens on golf courses, if necessary injector rollers with very thin and short injectors may be used.

Preferred injector diameters lie in the range from 1 to 5 mm, for example 2-4 mm, while preferred nozzle or injector openings are between 0.5 and 4 mm, for example 1-3 mm.

Thanks to this method, the evaporation of the water remaining on the surface is reduced to virtually zero. Moreover, the amount of water necessary for reliably supplying the roots is channeled directly to the regions of the roots, and is likewise reduced.

The invention claimed is:

1. A mobile apparatus for irrigating soil according to requirements, comprising:
    an irrigation unit for irrigating the soil,
    a mobile microwave measuring unit for determining water content of the soil along a measuring path, and
    wherein, by the aid of a control unit, the soil is irrigated using the irrigation unit in accordance with the water content along the measuring path measured using the mobile microwave measuring unit.

2. The apparatus as claimed in claim 1, wherein the mobile microwave measuring unit comprises at least one microwave source and a microwave detector provided at a distance from the microwave source.

3. The apparatus as claimed in claim 1, further comprising a water tank.

4. The apparatus as claimed in claim 1, further comprising a high-pressure device for the pressurized delivery of at least one water jet in the direction of the ground.

5. The apparatus as claimed in claim 4, wherein water is delivered through at least one injector with an injector diameter of 1 to 5 mm.

6. The apparatus as claimed in claim 1, wherein water is delivered through injectors, and a number of injectors are provided at regular intervals over the circumference of a pipe and the injectors comprise outlet openings which are at an angle to a longitudinal axis of the injectors.

7. The apparatus as claimed in claim 1, further comprising a color sensor for establishing a grassy or bare area of ground.

8. A method for irrigating soil according to requirements, comprising the steps of:
    making a mobile determination of the water content of soil along a measuring path by using microwave radiation, and
    irrigating a region of the ground in accordance with the measured water content of the soil along the measuring path.

9. The method as claimed in claim 8, wherein the path traveled along is predetermined or self-determined in such a way that all the regions of ground are irrigated according to requirements.

10. The method as claimed in claim 9, wherein, to determine the water content of the soil, a depth profile of the water content of the soil is determined by absorption measurement and reflection measurement of microwaves.

11. The method as claimed in claim 8, wherein water carried along in a mobile water tank is used for irrigation and, when the water in the water tank or the energy in the mobile measuring device reaches or goes below a minimum amount, a correspondingly set-up docking station is automatically traveled to for recharging with water and/or energy.

12. The method as claimed in claim 8, wherein irrigation is performed with at least one water jet directed toward the ground.

13. The method as claimed in claim 12, wherein the at least one water jet is directed toward the ground under high pressure in a pressure range from 2 to 40 bar.

14. The method as claimed in claim 12, wherein the at least one water jet is introduced directly into the soil by the aid of an injector at least partially inserted in the ground.

15. A mobile car for determining water content of soil along a measuring path, the mobile car comprising a microwave measuring unit structured and configured to emit microwave energy into the soil for determining the water content of the soil along the measuring path.

16. The mobile car according to claim 15, wherein the mobile car is an automatically travelling car.

17. The mobile car according to claim 15, wherein the microwave measuring unit comprises at least one microwave source and a microwave detector at a distance from the microwave source.

18. The mobile car according to claim 15, wherein the mobile car is structured and configured for travelling on predetermined tracks.

19. The mobile car according to claim 15, wherein the mobile car is structured and configured for travelling on self-defined tracks in an area to be irrigated.

20. The mobile car according to claim 15, wherein the mobile car is structured and configured for continuously measuring the soil moisture along the measuring path.

21. The mobile car according to claim 15, wherein the mobile car is structured and configured for measuring the soil moisture along the measuring path at intervals.

22. The mobile car according to claim 15, wherein the mobile car is structured and configured for assigning determined water contents of the soil to position coordinates along the measuring path for recording a moisture map.

23. The mobile car according to claim 15, wherein the mobile car is free of an irrigation device and free of a tank for water for irrigation.

24. A method for determining water content of soil along a measuring path, the method comprising using a mobile car including a microwave measuring unit structured and configured to emit microwave energy into the soil for determining the water content of the soil along the measuring path by microwave radiation.

25. The method according to claim 24, comprising:
  determining the water content of the soil along the measuring path using the mobile car;
  assigning determined water contents of the soil to position coordinates along the measuring path; and
  recording a moisture map containing the mutually assigned water contents and position coordinates.

26. An irrigation arrangement comprising a mobile car including a microwave measuring unit structured and configured to emit microwave energy into the soil for determining water content of the soil along a measuring path.

27. The irrigation arrangement of claim 26, wherein an irrigation device of the irrigation arrangement is a mobile irrigation device.

28. The irrigation arrangement of claim 26, wherein an irrigation device of the irrigation arrangement is a fixedly installed irrigation device.

* * * * *